(12) United States Patent
Sarbin et al.

(10) Patent No.: US 10,778,536 B1
(45) Date of Patent: Sep. 15, 2020

(54) RING CONNECTION CHART FOR NETWORK ORCHESTRATION

(71) Applicant: Cisco Technology, Inc., San Jose, CA (US)

(72) Inventors: Brian Sarbin, Belmont, CA (US); Min Jung Chu, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 16/288,401

(22) Filed: Feb. 28, 2019

(51) Int. Cl.
*H04L 12/24* (2006.01)

(52) U.S. Cl.
CPC .......... *H04L 41/22* (2013.01); *H04L 41/0803* (2013.01)

(58) Field of Classification Search
CPC ........................ H04L 41/22; H04L 41/0803
See application file for complete search history.

(56) References Cited

U.S. PATENT DOCUMENTS

| | | | |
|---|---|---|---|
| 9,294,349 B2 | 3/2016 | Jain et al. | |
| 9,860,116 B1 | 1/2018 | Jain et al. | |
| 10,534,637 B1 * | 1/2020 | Kontsov | G06F 9/4843 |
| 2005/0144188 A1 * | 6/2005 | Bailey | G06Q 10/0639 |
| 2017/0310611 A1 * | 10/2017 | Kumar | H04L 67/2842 |
| 2017/0366428 A1 | 12/2017 | Shaw et al. | |
| 2018/0097876 A1 | 4/2018 | Rolia et al. | |
| 2019/0386891 A1 * | 12/2019 | Chitalia | H04L 43/0811 |

OTHER PUBLICATIONS

Halpern, "RFC7665, Service Function Chaining (SFC) Architecture", Internet Engineering Task Force (IETF), Oct. 2015. (Year: 2015).*
Szyrkowiec, Thomas, et al. "Automotic Intent-Based Secure Service Creation through a Multilayer SDN Network Orchestration," Mar. 8, 2018, pp. 1-8.

* cited by examiner

*Primary Examiner* — Gil H. Lee
*Assistant Examiner* — Chhian (Amy) Ling
(74) *Attorney, Agent, or Firm* — Polsinelli PC

(57) ABSTRACT

The present technology pertains to an interactive ring chart user interface for conveying a view of service chains between two logical network objects (physical devices, data centers, applications, services, virtual network functions, etc.). In addition to displaying the service chains, the interactive ring chart can receive user inputs to select a logical network object to view or modify details regarding connections to or from the network object in a detailed view. Additionally, the interactive ring chart can be used to create new service chains between two logical network objects.

18 Claims, 13 Drawing Sheets

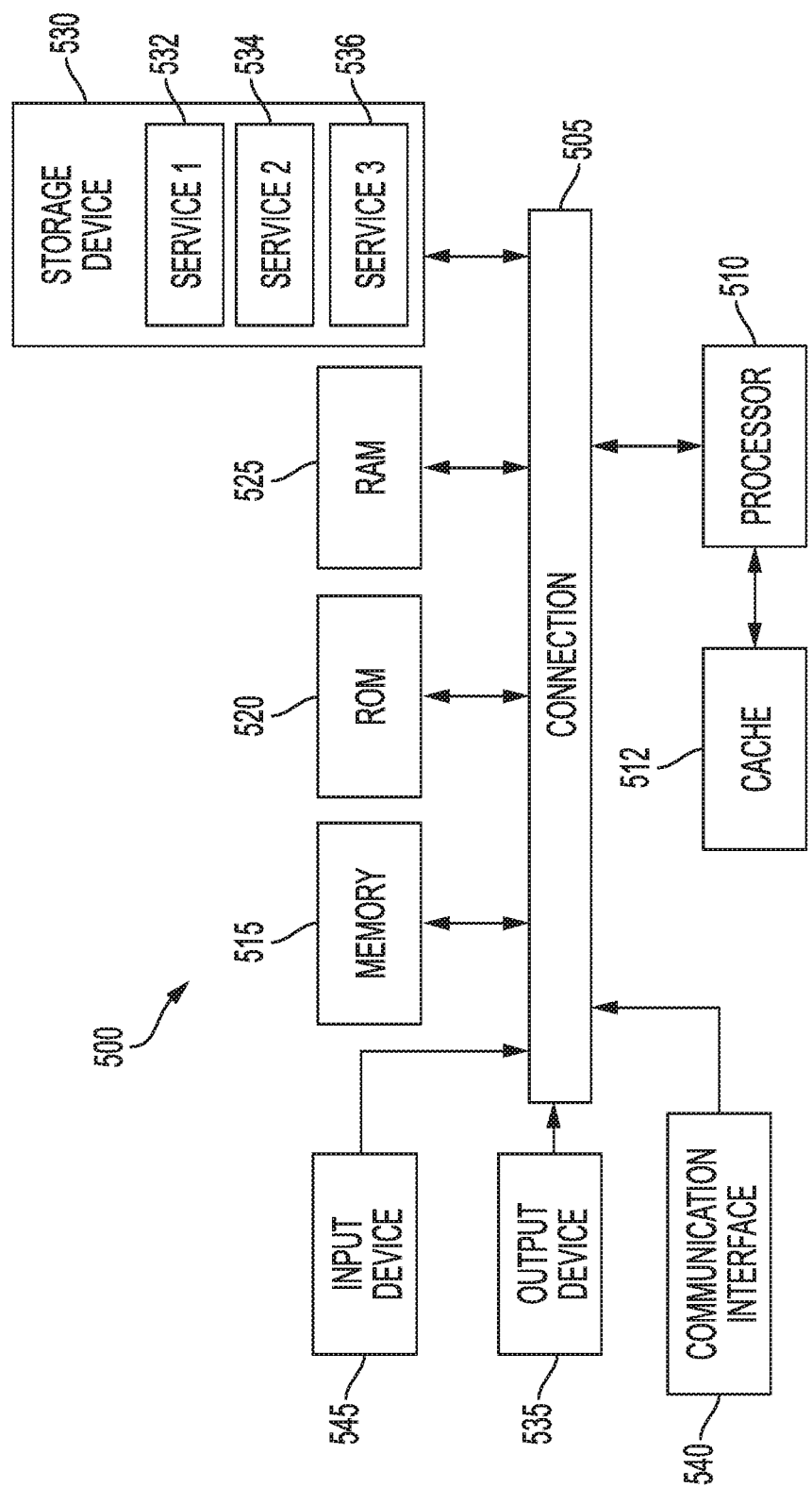

RING CONNECTION CHART FOR NETWORK ORCHESTRATION

TECHNICAL FIELD

The present technology pertains to a user interface for configuring virtual network functions and more specifically pertains to a ring chart user interface for configuring and deploying a service chain between two network endpoints.

BACKGROUND

While various orchestration tools have made orchestration of network functions and service chains between network services, network functions, and network endpoints much easier, there are still many real and virtual devices and services to keep track of.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 9 illustrates an example system embodiment of a computing system, such as a network orchestrator, in accordance with some aspects of the present technology.

DESCRIPTION OF EXAMPLE EMBODIMENTS

Figure 1:
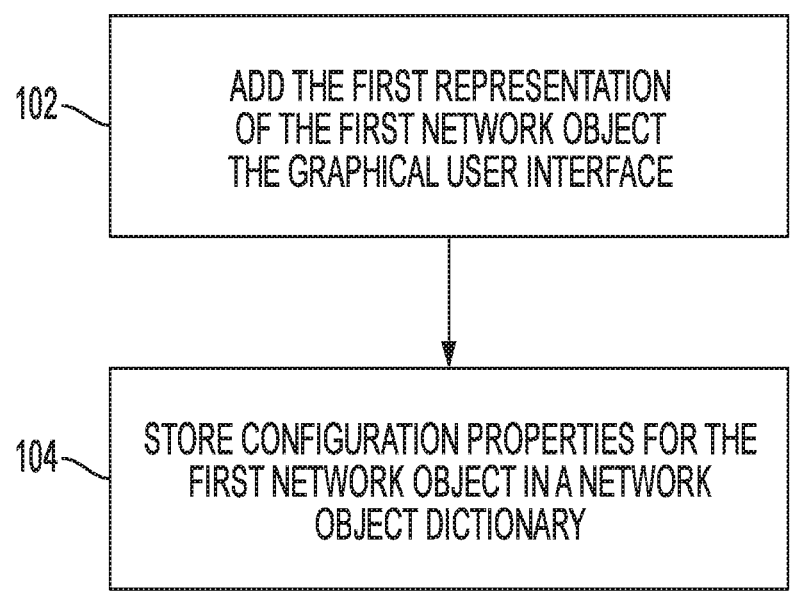
FIG. 1 illustrates an example method embodiment in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to presenting a graphical user interface made up of representations of network objects that can be useful to view connections and service chains between the network objects as well as to set up connections and service chains between network objects. The present technology can receive an input, using the graphical user interface, that selects a first representation of a first network object from the representations of the network objects and deposits the first network object on to a second representation of a second network object. After receiving the input, a network orchestration service can automatically configure a service chain between the first network object and the second network object.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The disclosed technology addresses the need in the art for a user interface that can allow an administrator to configure, view the status of, and manage, service chains and connections between network objects. While network orchestration tools might provide reasonable mechanisms for orchestrating service chains, their interfaces are hard to use, and not practical to use to view service chains at network scale where many network objects are connected to many other objects. The present technology provides an intuitive interface wherein every relevant network object can be viewed along with the connections between them. In some embodiments, the status of the service chains is also viewable. Simply dragging one network object onto another network object can create new service chains. Detailed views of service chains and the ability to make adjustments to their configurations are provided through a detailed view.

A used herein the term "configured" shall be considered to be interchangeably used to refer to configured and configurable, unless the term "configurable" is explicitly used to distinguish from "configured." The proper understanding of the term will be apparent to persons of ordinary skill in the art in the context in which the term is used.

As described herein, the present technology pertains to an interactive ring chart user interface for conveying a view of service chains between two logical network objects (physical devices, data centers, applications, services, virtual network functions, etc.). In addition to displaying the service chains, the interactive ring chart can receive user inputs to select a logical network object to view or modify details regarding connections to or from the network object in a detailed view. Additionally, the interactive ring chart can be used to create new service chains between two logical network objects.

FIG. 1 illustrates an example method for populating the interactive ring chart with logical network objects to form its ring. FIG. 1 will be discussed in the context of FIG. 2 for greater clarity and understanding by the reader; however, neither FIG. 1 nor FIG. 2 should be considered limited by the embodiments of either Figure; rather, the present technology is defined by the appended claims.

Figure 2:
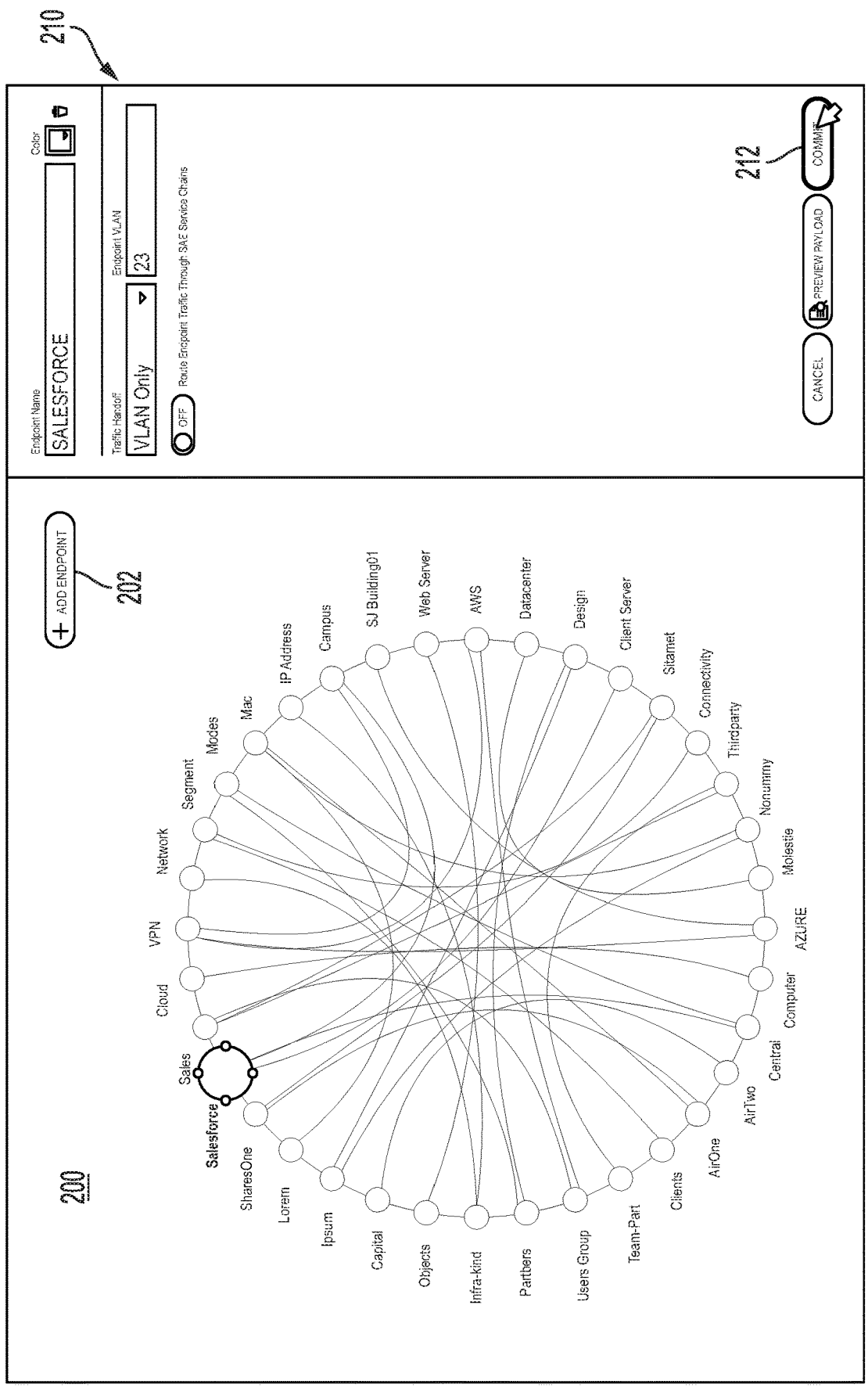
FIG. 2 illustrates an example user interface embodiment including a ring chart in accordance with some aspects of the present technology.

To populate the interactive ring graph user interface 200 with logical network objects, an administrator operating a computing device can select user control 202. As illustrated in FIG. 2, user control 202 can take the form of a button or other user-selectable control. In response to receiving the selection of new endpoint user interface control 202, an orchestration service can add (102) a representation of a network object to the graphical user interface. Additionally, a detail view 210 can be presented for entering configuration properties for the new network object.

The administrator can enter basic network object configuration properties for the network object into detail view 210, which can be received by the user interface and stored (104) in a network object dictionary by the orchestration service. Network object configuration properties include any configuration which either defines the object, defines how to "connect" to the object, or defines how data must be formatted when arriving or leaving. For example, examples of network object configuration properties are: IP Address (definition), Geo Location (definition), Name (definition), Routing Protocol (connection), Configuration of the Routing (connection), Encrypted data, etc. Additionally, if the network object is an abstraction for multiple connections, then the network object configuration properties include configurations for the connections. If the object has a gateway, any information needed to connect to that gateway is also included in the network object configuration properties. These definitions could be used when creating the interfaces between he service chains defined in the interface and the object. In the illustrated example, the configuration is a definition of how to "connect" to the object and the switch indicates how data is supposed to behave when traversing to/from this object.

Once the configuration properties are populated into detail view 210, the administrator can select, and the user interface can receive the selection of the commit user interface control 212. Thereafter, the network orchestration service uses the network object configuration properties to define the network object in the network object dictionary. At this point, no deployment activity occurs. Instead, this information is stored in a dictionary and is used as a partial configuration for the network objects for creating new connections to the network object.

Figure 3:
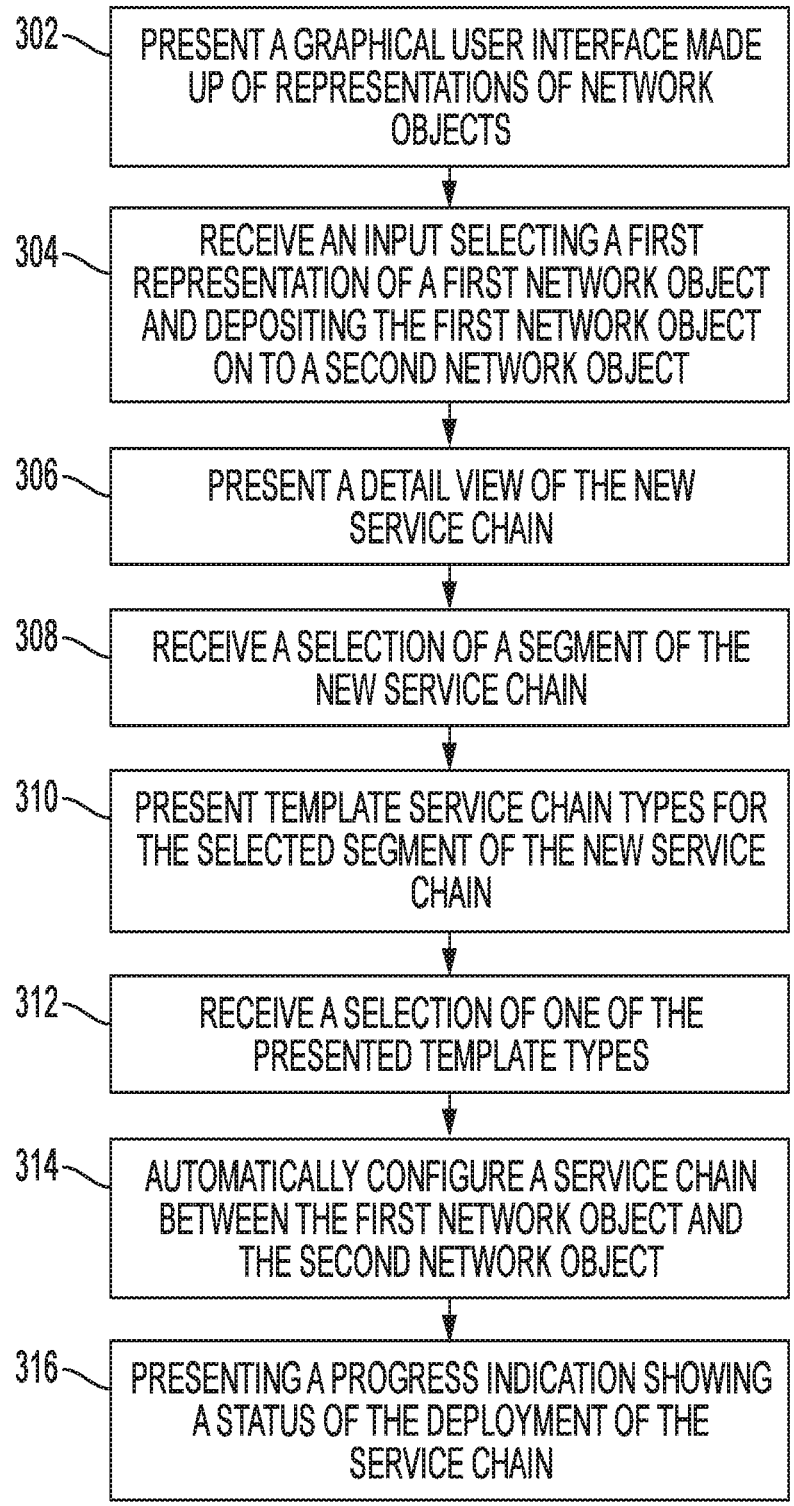
FIG. 3 illustrates an example method embodiment in accordance with some aspects of the present technology.

FIG. 3 illustrates an example method for creating and deploying a new service chain between at least two network objects. FIG. 3 will be discussed in the context of FIGS. 4A, 4B, 4C, 5A, 5B, and 5C for greater clarity and understanding by the reader. However, none of FIGS. 3, 4A, 4B, 4C, 5A, 5B, and 5C should be considered limited by the embodiments of each other. Rather, the present technology is defined by the appended claims.

When the interactive ring graph user interface 200 has at least two network objects represented therein, the interactive ring graph user interface 200 can be used to orchestrate service chains between the network objects. Therefore, the method illustrated in FIG. 3 begins when the interactive ring graph user interface 200 presents (302) representations of network objects—for example, network objects remote VPN 204, AZURE 205, capital 206, Amazon Web Services (AWS) 207, and salesforce 208. In some embodiments, the represented network objects are virtual network objects (e.g., remote VPN 204), which are implementations of network functions using software. In some embodiments, the represented network objects are applications or storage services hosted by a specific cloud provider (e.g., Capital, Salesforce, etc.). In some embodiments, the represented network objects are other applications or services which may be instantiated in a public cloud. (e.g., AZURE, 205, AWS 207, etc.).

Figure 4A:
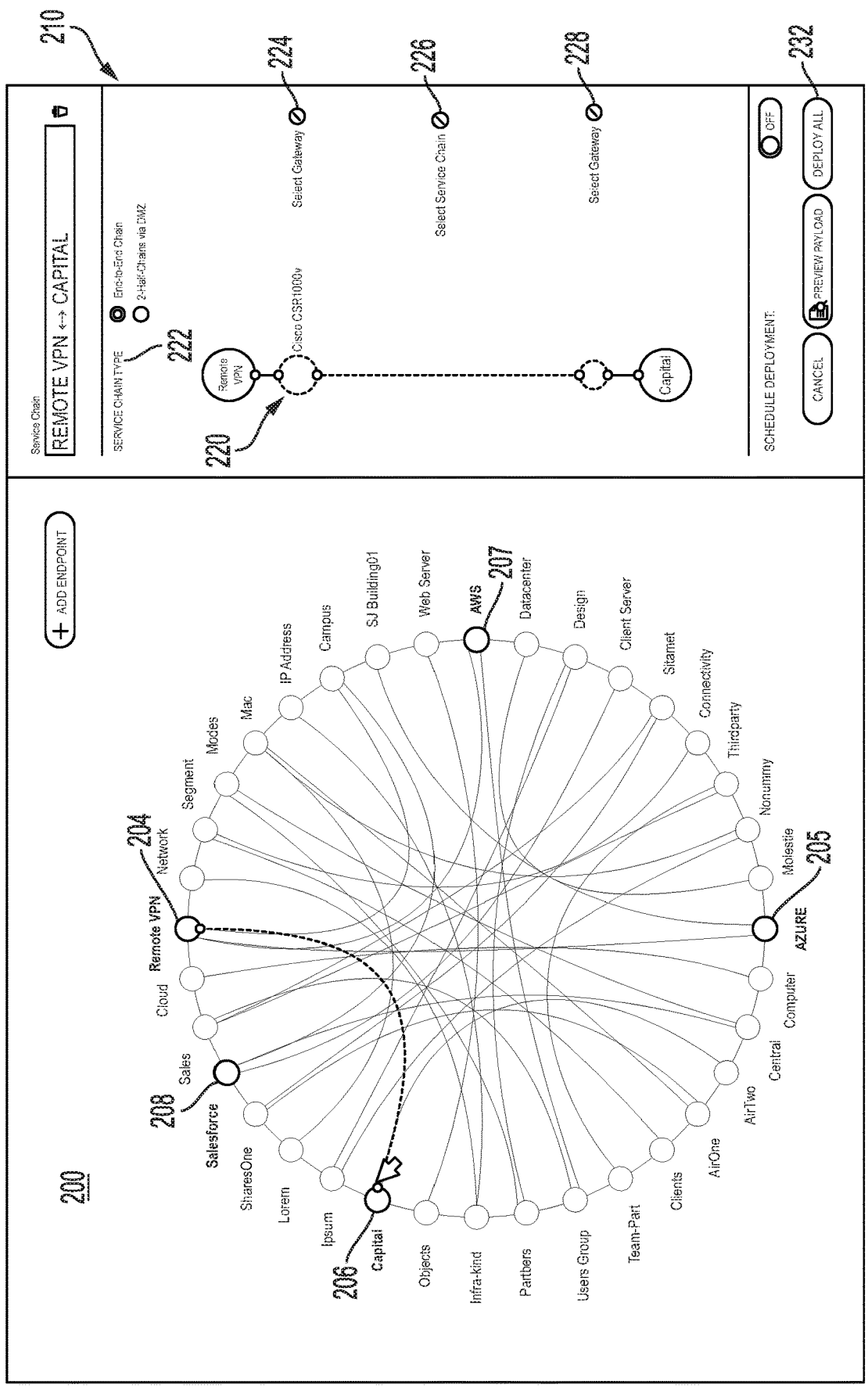
FIGS. 4A, 4B, and 4C illustrate example user interface embodiments including a ring chart in accordance with some aspects of the present technology.

The orchestration service can receive (304) an input in user interface 200, where the input is a selection of (304) a representation of a network object. The input can further drag the selection of the representation of the network object to another network object where it is deposited. For example, and as shown in FIG. 4A, the representation of the application, capital 206, can be selected and dragged and dropped onto the representation of the network function, remote VPN, 204. The orchestration service can receive and interpret this input in user interface 200 as a command to create a service chain between the application, capital 206, and the network function, remote VPN 204.

Additionally, when the representation of the network object is selected (304) any network objects that are incompatible with first network object can be distinguished from network objects that can be connected with the first network object. For example, incompatible network objects can be grayed out. The orchestration service can determine compatibility or incompatibility of network objects based on properties listed for the network objects in the object dictionary.

In some embodiments, a network object can be considered incompatible based on business policies or technical limitations. For example, some business policies include: a policy stipulating the number of connections between objects; a policy limiting the total connections into an object; a policy which stipulates certain categories of objects can only connect to other objects that meet some mutual criteria (e.g. if one object is flagged as INTERNAL CONFIDENTIAL, a policy could exist that prevents users from connecting it to objects which are not secure/aren't required to have high security connections in place), etc. Examples of possible technical limitations include: number of virtual ports defined on a gateway, or an incompatibility difference in configuration between objects (one could have BGP, the other OSPF), etc.

The orchestration service can present (306) detail view 210 of the new service chain. As illustrated in FIG. 4A, the service chain between the application, capital 206, and the network function, remote VPN 204 is being configured as represented by the dotted line. Detail view 210 shows the selected service chain in more detail, and in particular service chain illustration 220 provides several selectable options 222, 224, 226, and 228 for further configuring the service chain. For example, selectable option 222 is an option to specify whether two network objects should be connected through a DMZ or connected directly. Selectable option 222 specifically refers to whether the service chain is an end-to-end service chain, or if the service chain is linking two logical half-chains together. This option recognizes that half chains are often for services located outside a trusted network, and traffic coming into any other network service is prudently routed through a DMZ, which limits access to specific hosts of the respective network objects that are connected through the DMZ.

An end-to-end chain directly connects applications, services, and network functions together. A half-chain is a representation of reusable collection of network objects that can form a logical object or function. For example, if any connection to AWS requires a router and a firewall, then each direct link would require these two network elements (which would be a lot of duplications of the same networking functions). Instead, a half chain that includes these two elements could be utilized. Other network objects only need to connect to the half-chain, thus reducing the total number of routers and firewalls needed to be deployed (since a router and firewall are already included in the AWS half chain). Thus, half-chains are used to provide reuse of network elements.

Selectable options 224, 226, and 228 pertain to respective segments of the service chain that can be configured. For example, selectable option 224 pertains to an option to configure a gateway to remote VPN 204. Selectable option 226 pertains to an option to configure the service chain between remote VPN 204 and capital 206. Selectable option 228 pertains to an option to configure a gateway to capital 206.

Figure 4B:
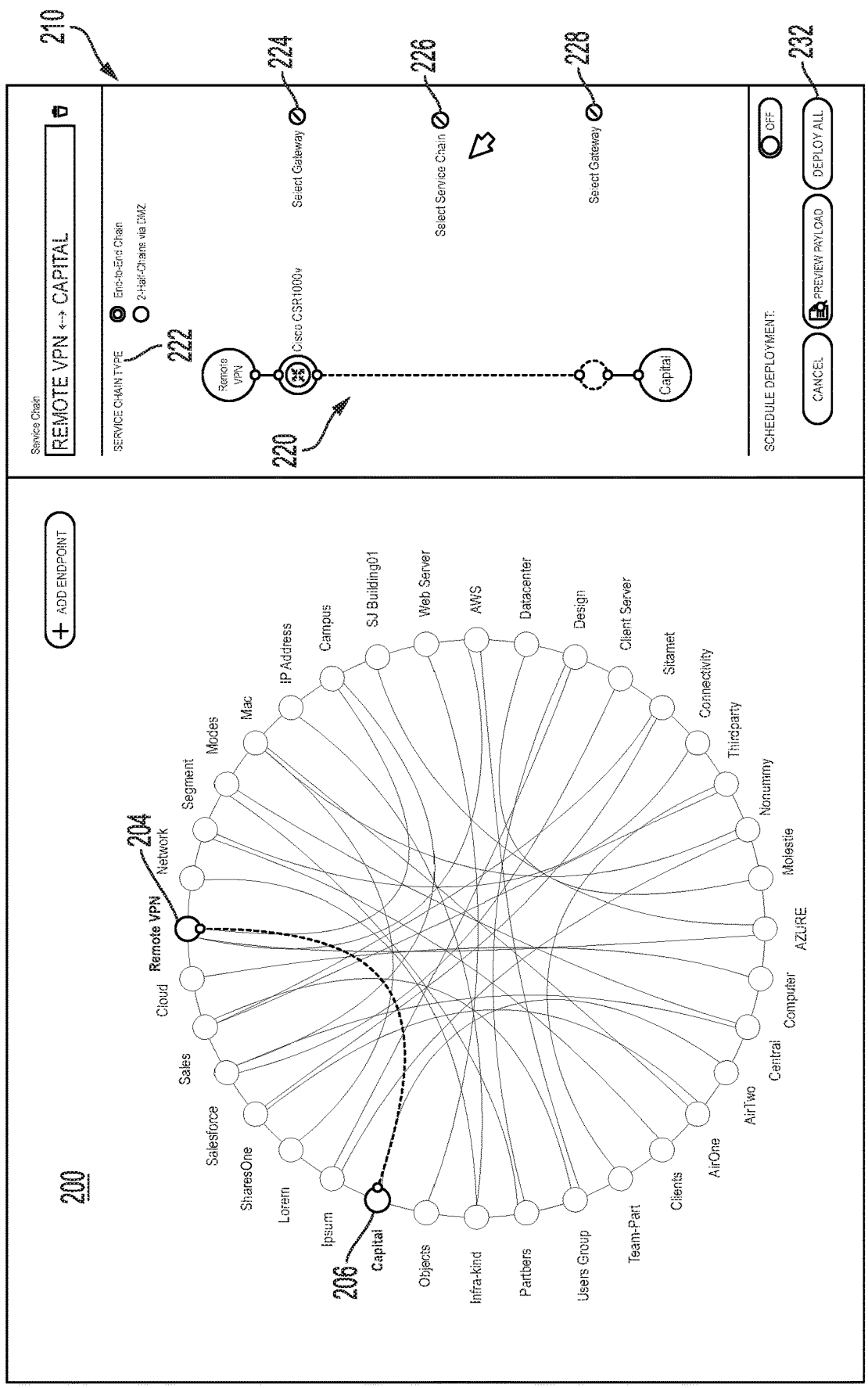
Figure 4C:
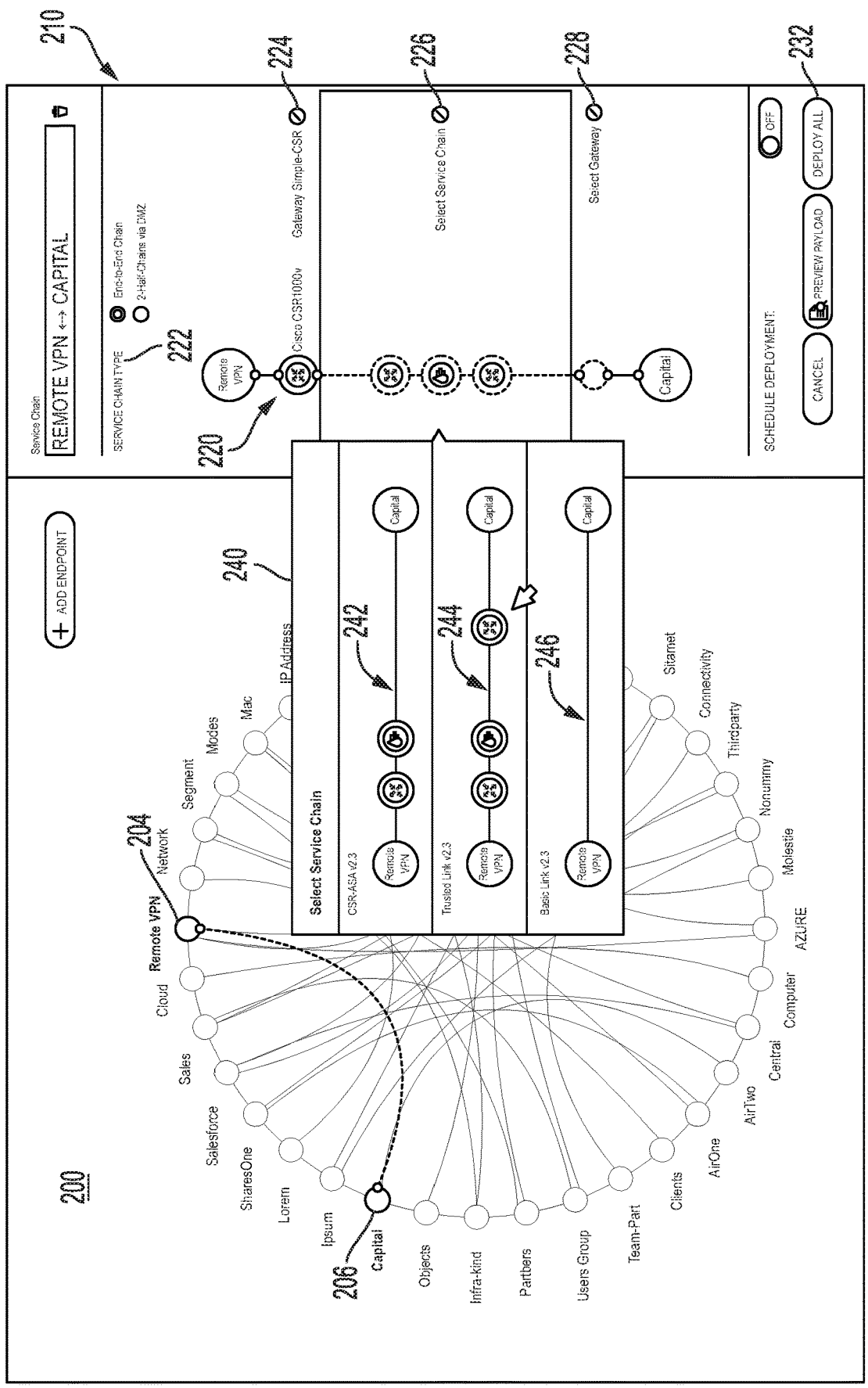
Figure 5A:
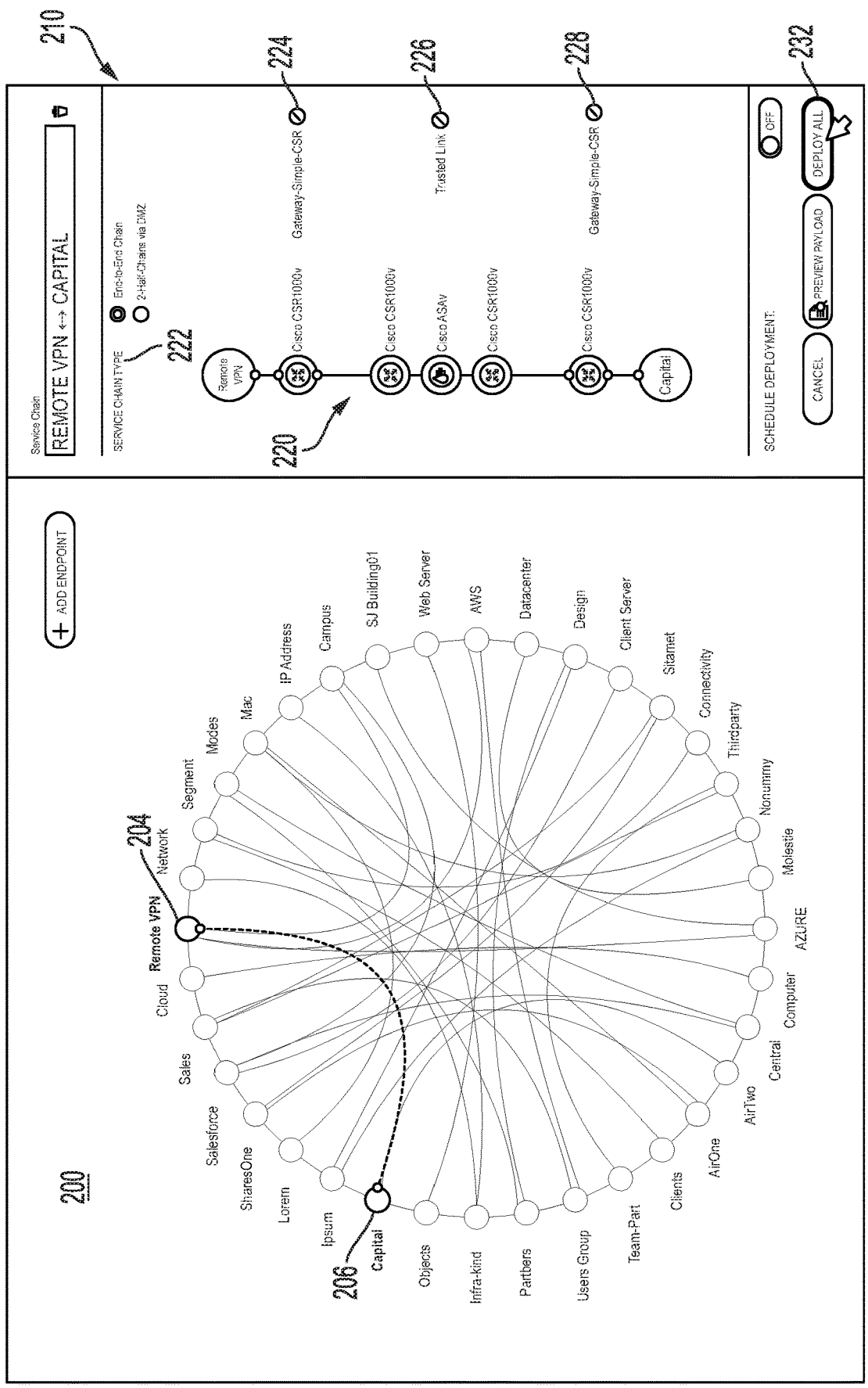
FIGS. 5A, 5B, and 5C illustrate example user interface embodiments including a ring chart in accordance with some aspects of the present technology.

The administrator can select one of the segments of the service chain in detail pane 210 and orchestration service can receive (308) a selection of the selected segment of the service chain. For example, as seen in FIG. 4B an administrator is selecting selectable option 226 to configure the service chain. After receiving (308) the selection of the segment of the service chain, the orchestration service can present (310) template options 240 including service chain types for the selected segment as seen in FIG. 4C. For example, FIG. 4C shows three different templates service change templates 242, 244, and 246. The administrator can then select one of the service chain templates from template options 240. As seen in FIG. 4C an administrator selects template option 244 which configures a router in front of remote VPN 204, a router in front of capital 206, and a firewall in between the two routers. The orchestration service can receive (312) the selection of the presented template, and further receive a selection of selectable option 232 to deploy the configuration, as illustrated in FIG. 5A. Thereafter the orchestration service can automatically configure (314) the service chain between the first network object and the second network object.

Orchestration includes the automated arrangement, configuration, coordination, and management of computer systems, middleware, and services. In the context of the present technology the orchestration service performs orchestration of virtual network functions, and service chaining between service providers, endpoints, virtual network functions, applications, and services. Orchestration coordinates, connects, monitors, and manages the needed resources from the platform for the network function virtualization services. Orchestration may need to coordinate with many network and software elements, including inventory systems, billing systems, provisioning tools, and operating support systems.

Figure 5B:
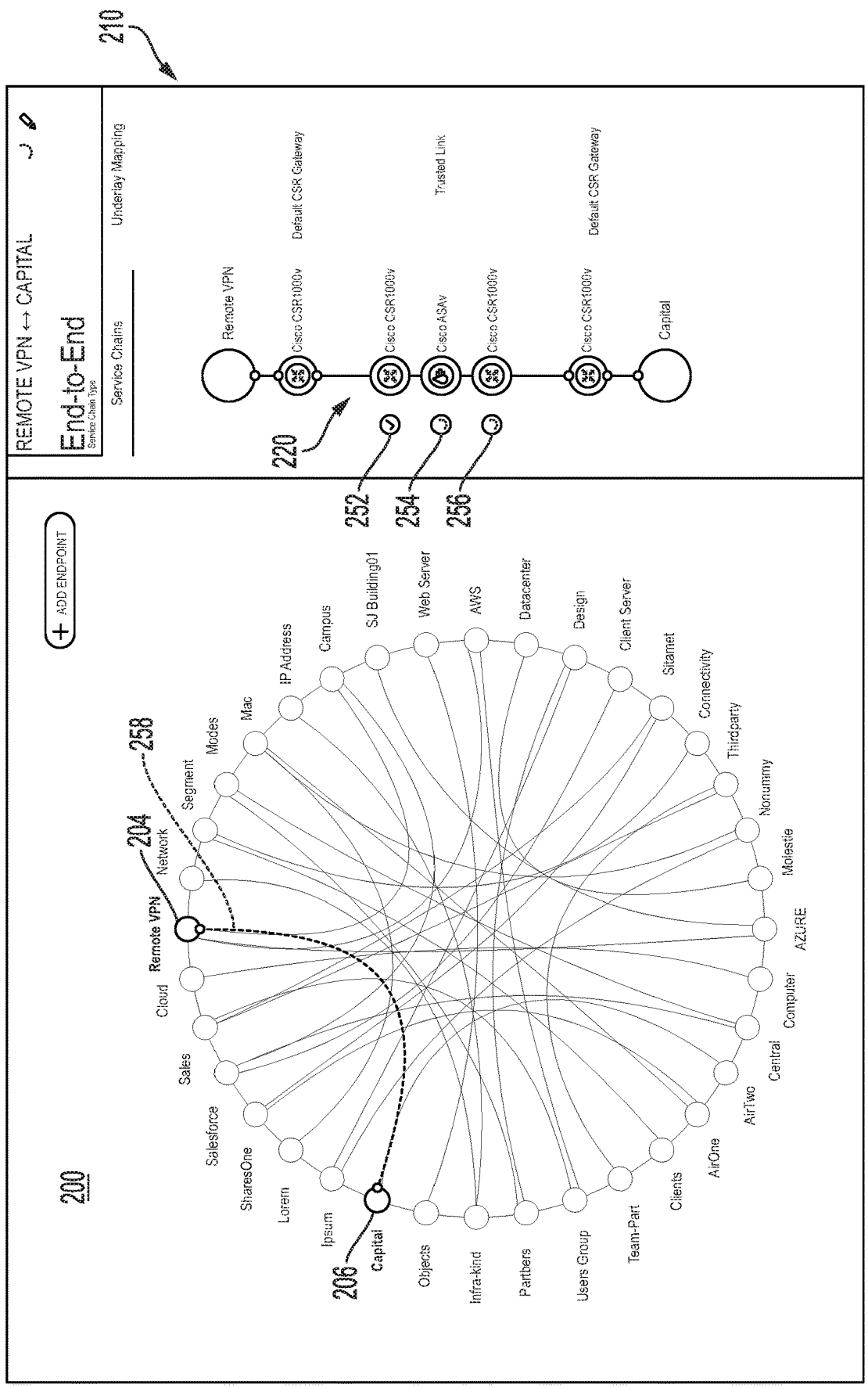
Figure 5C:
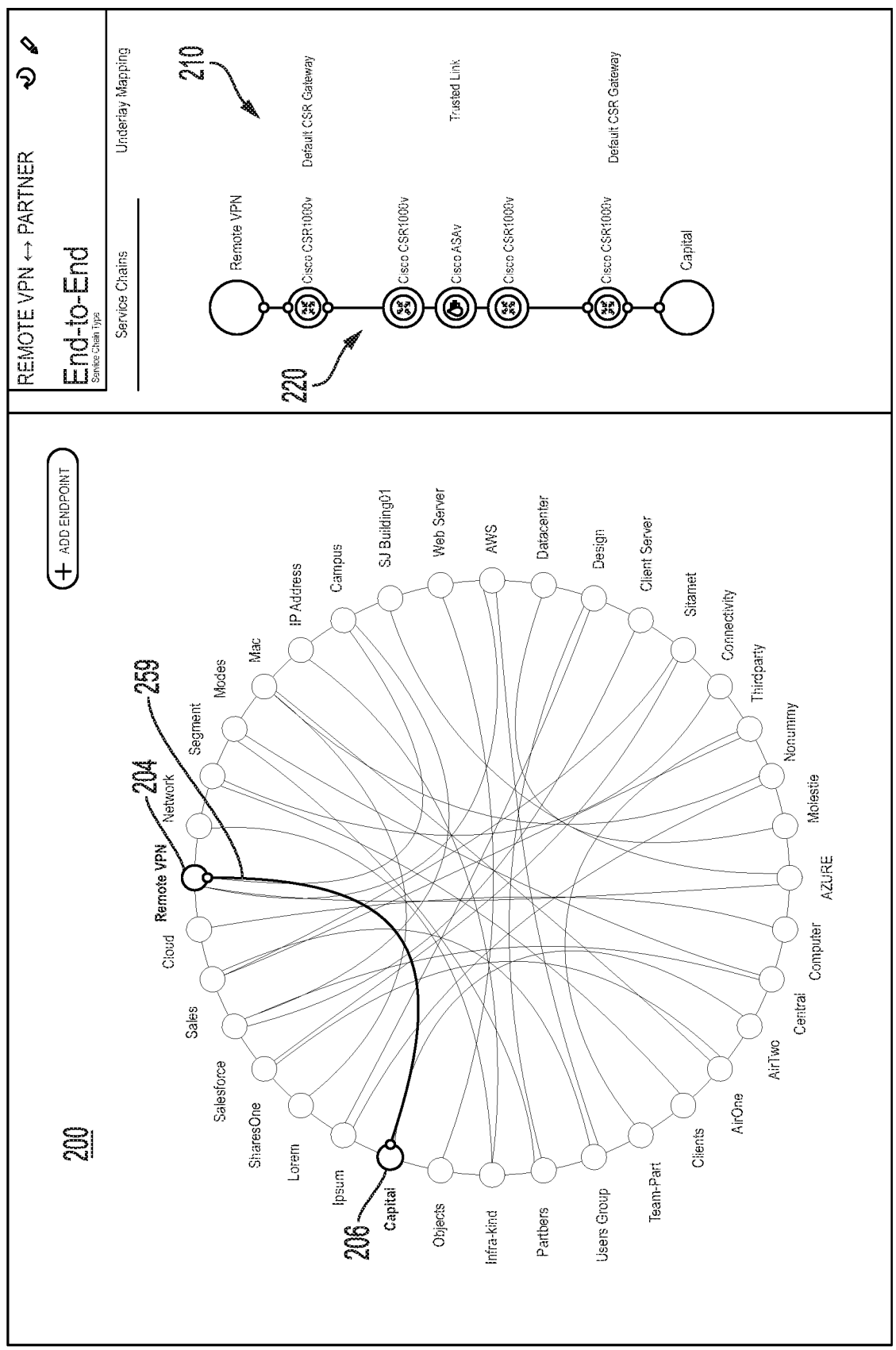

As illustrated in FIG. 5B, the orchestration service can present (316) progress indicators showing the status of the deployment of the service chain. Detail pain 210 shows that a first router in the service chain has been deployed as is illustrated by the checkmark icon 252, but the firewall and the next router in the service chain have not yet been fully provisioned as illustrated by the animated icons 254, 256. Ring chart 200 also shows that the service chain between remote VPN 204 and Capital 206 has not been fully deployed yet as indicated by dotted line 258. Once the service chain has been fully deployed ring graph 200 will show a solid line between remote VPN 204 and Capital 206, as illustrated in FIG. 5C.

Figure 6:
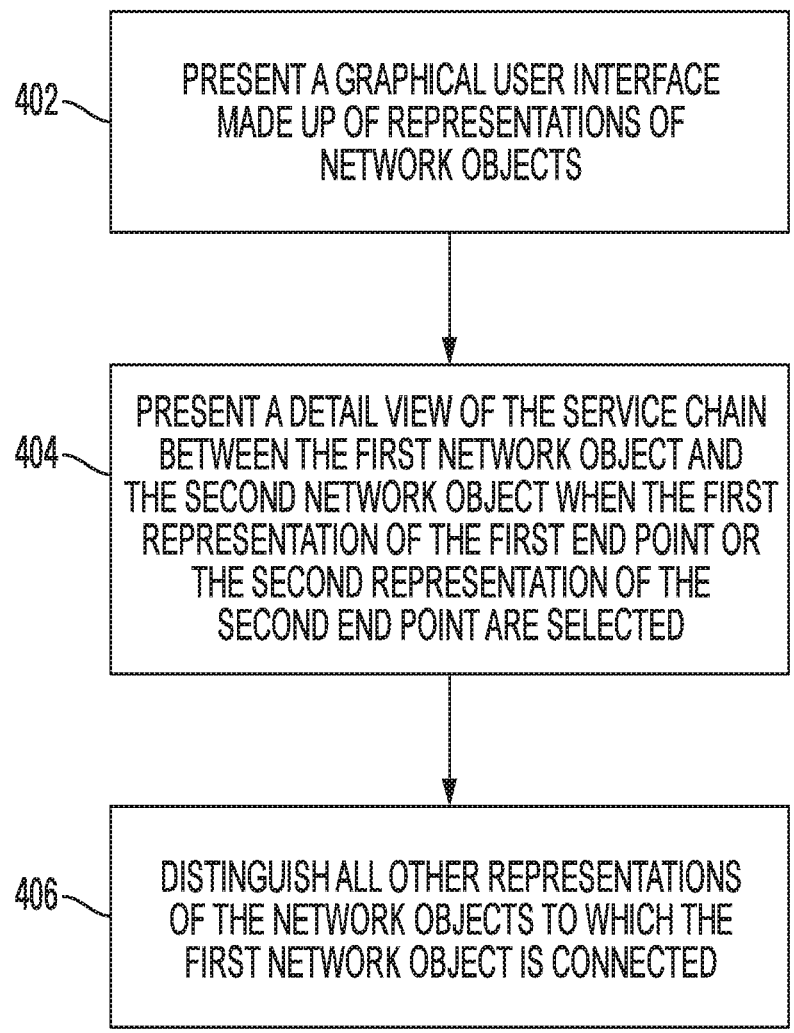
FIG. 6 illustrates an example method embodiment in accordance with some aspects of the present technology

The orchestration service and user interface 200 are effective not only to configure service chains but also to show the status of various service chains. FIG. 6 illustrates an example method for showing the status of the service chains shown in ring chart 200. FIG. 6 will be discussed in the context of FIGS. 7, and 8 for greater clarity and understanding by the reader. However, none of FIGS. 6, 7, and 8 should be considered limited by the embodiments of each other. Rather, the present technology is defined by the appended claims.

Figure 7:
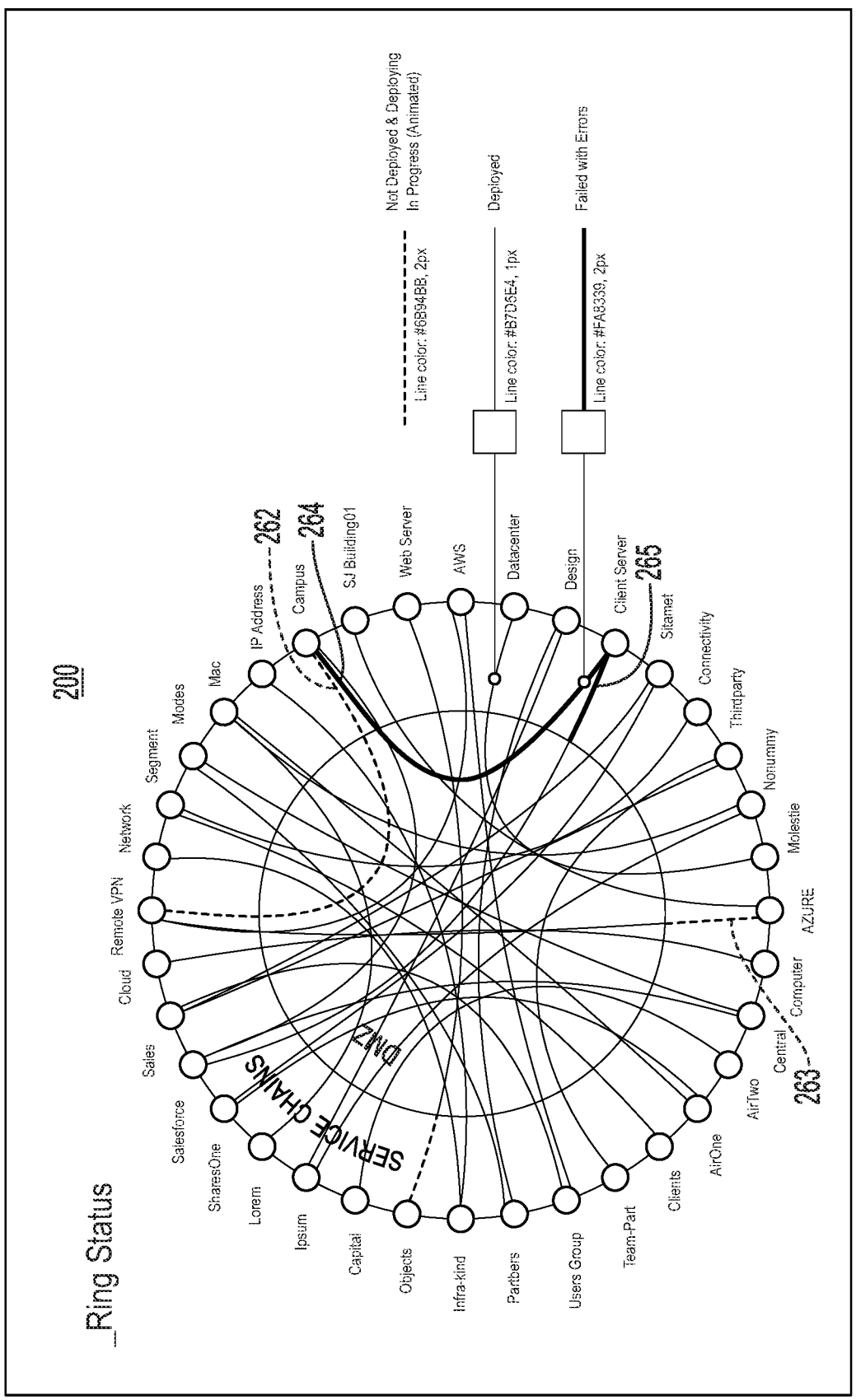
FIG. 7 illustrates an example user interface embodiment including a ring chart in accordance with some aspects of the present technology.

Orchestration service can present (402) ring chart 200 made up of representations of network objects and service chains between the network objects, including status indicators pertaining to the respective service chains. For example, as seen in FIG. 7, service chain 267 between the AZURE and data center is fully deployed (as shown by a light line), while service chain 262 between remote VPN and campus is in the progress of being deployed (as shown by a dotted line). Some service chains have failed to deploy such as service chain 264 between campus and client/server. Other service chains are shown to be partially deployed such as service chain 263 between remote VPN and AZURE. A light line represents a first part of service chain 263 from remote VPN through the DMZ, while a second portion of the service chain from the DMZ to AZURE is shown in a dashed line indicating that it is still in progress of being deployed. Service chain 265 between SharesOne and Client Server is partially deployed but the orchestration of the service chain between the DMZ and the client/server has failed with errors, and this is indicated by a light line from SharesOne through the DMZ and a dark line from the DMZ to Client Server.

Figure 8:
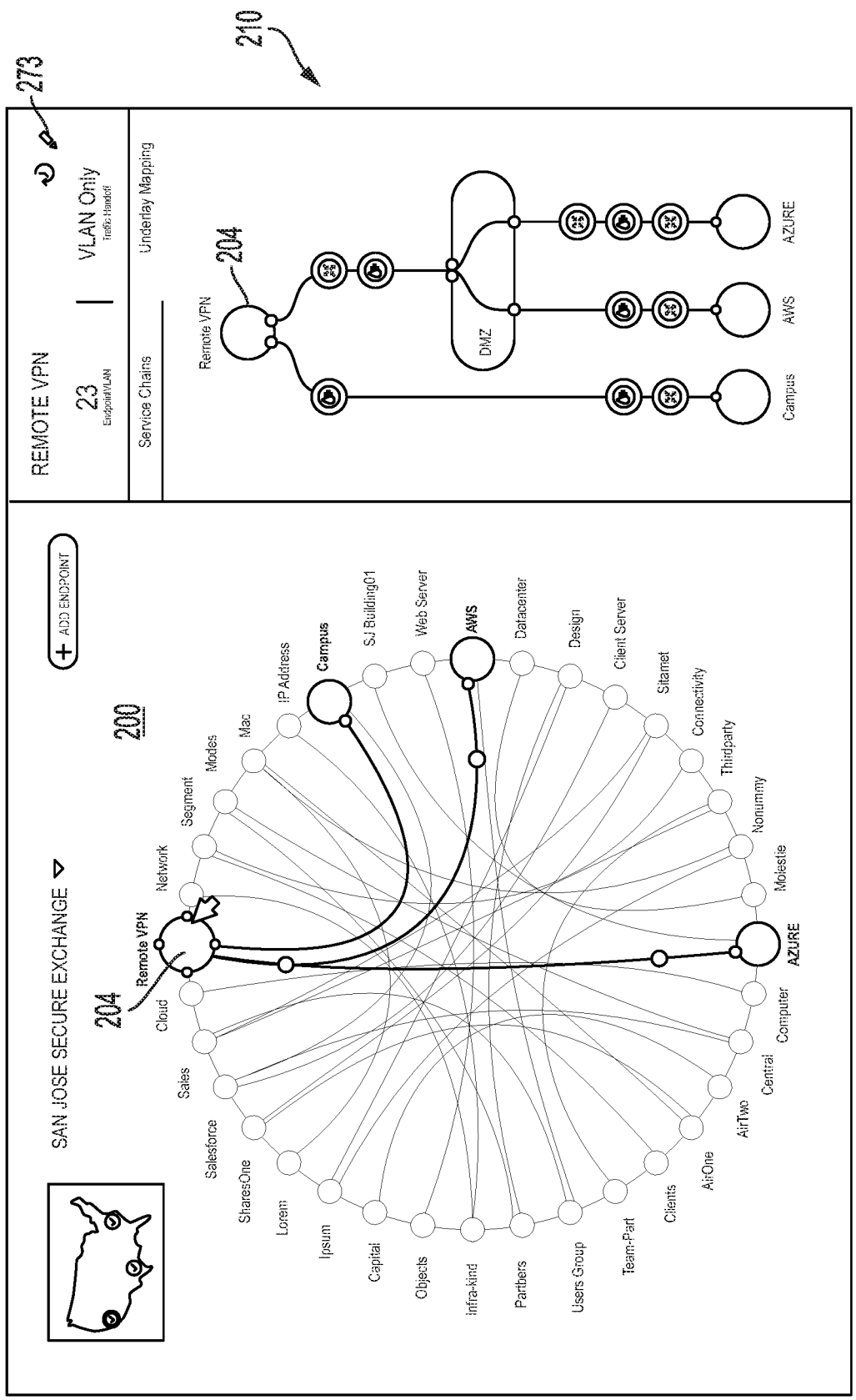
FIG. 8 illustrates an example user interface embodiment including a ring chart in accordance with some aspects of the present technology.

While FIG. 7 shows an overview of the status of all the connections between the network objects, FIG. 8 illustrates a detailed view have all connections originating from the selected network object. When an administrator selects a particular network object such as remote VPN 204 as shown in FIG. 8, the orchestration service can receive the selection and can present (404) a detailed view of the service chains to which the selected network object is connected in detail pane 210. As shown in FIG. 8 ring chart 200 has also been adjusted to distinguish (406) all connections between remote VPN 204 and the other network objects to which is connected, and a further detail view is shown and details pane 210.

As seen in FIG. 8 details pane 210 shows the respective service chains connected to remote VPN 204 in greater detail. For example, details pane 210 shows that remote VPN 204 is connected to a campus network without passing through with DMZ, but traffic does pass through two firewalls and a router. Further remote VPN is connected to both AWS and AZURE by passing traffic through the DMZ and several routers and firewalls.

If the administrator desires to edit the configuration, the administrator can select selectable option 273 to edit the service chains as illustrated in FIG. 4B and FIG. 4C.

FIG. 9 shows an example of computing system 500, which can be for example any computing device making up the orchestration service, or any device or system responsible for presenting and displaying the user interfaces described herein, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable medium comprising instructions stored thereon, the instructions being effective to cause a computing system to:
  present a graphical user interface made up of representations of network objects, wherein the representations of the network objects form a ring graph with lines representing service chains between respectively connected network objects;

receive an input, by the graphical user interface, selecting a first representation of a first network object from the representations of the network objects and depositing the first network object on to a second representation of a second network object; and after receipt of the input, automatically configure a service chain between the first network object and the second network object by an orchestration service, and when a line connecting the first network object and the second network object is selected, present a detail view of the service chain between the first network object and the second network object.

2. The non-transitory computer-readable medium of claim 1, wherein the instructions cause the computing system to:
add the first representation of the first network object the graphical user interface; and
store configuration properties for the first network object in a network object dictionary.

3. The non-transitory computer-readable medium of claim 1, wherein the instructions cause the computing system to:
during the received input selecting the first representation of the first network object, distinguish network objects that are incompatible with first network object.

4. The non-transitory computer-readable medium of claim 1, wherein the instructions cause the computing system to:
when the first representation of the first network object or the second representation of the second network object are selected, present a detail view of the service chain between the first network object and the second network object; and
present at least one configuration option template in the detail view, when selected the at least one configuration option can be used to define the service chain further.

5. The non-transitory computer-readable medium of claim 1, wherein the automatic configuration of the service chain between the first network object and the second network object by the orchestration service includes deploying the automatically configured service chain; and
presenting a progress indicator showing a status of the deployment of the service chain.

6. The non-transitory computer-readable medium of claim 1, wherein the instructions cause the computing system to:
when the first representation of the first network object is selected, distinguish all other representations of the network objects to which the first network object is connected.

7. The non-transitory computer-readable medium of claim 1, wherein any of the representations of network objects can be a representation of a collection of network objects forming a logical object or function.

8. The non-transitory computer-readable medium of claim 1, wherein the representations of the network objects are representations of virtual network functions.

9. A method comprising:
presenting a graphical user interface made up of representations of network objects, wherein the representations of the network objects form a ring graph with lines representing service chains between respectively connected network objects;
receiving an input, by the graphical user interface, selecting a first representation of a first network object from the representations of the network objects and depositing the first network object on to a second representation of a second network object; and
after receiving the input, automatically configuring a service chain between the first network object and the second network object by an orchestration service, and when a line connecting the first network object and the second network object is selected, present a detail view of the service chain between the first network object and the second network object.

10. The method of claim 9, comprising:
adding the first representation of the first network object the graphical user interface; and
storing configuration properties for the first network object in a network object dictionary.

11. The method of claim 9, comprising:
when the first representation of the first network object or the second representation of the second network object are selected, presenting a detail view of the service chain between the first network object and the second network object; and
presenting at least one configuration option template in the detail view, when selected the at least one configuration option template can be used to deploy the service chains defined by the configuration option template.

12. The method of claim 9, comprising:
when the first representation of the first network object is selected, distinguishing all other representations of the network objects to which the first network object is connected.

13. The method of claim 9, wherein any of the representations of network objects can be a representation of a collection of network objects forming a logical object or function.

14. A system comprising:
at least one processor; and
a storage including instructions stored thereon, the instructions being effective to cause a computing system to:
present a graphical user interface made up of representations of network objects, wherein the representations of the network objects form a ring graph with lines representing service chains between respectively connected network objects;
receive an input, by the graphical user interface, selecting a first representation of a first network object from the representations of the network objects and depositing the first network object on to a second representation of a second network object; and
after receipt of the input, automatically configure a service chain between the first network object and the second network object by an orchestration service, and when a line connecting the first network object and the second network object is selected, present a detail view of the service chain between the first network object and the second network object.

15. The system claim 14, wherein the instructions cause the computing system to:
during the received input selecting the first representation of the first network object, distinguish network objects that are incompatible with first network object.

16. The system claim 14, wherein the instructions cause the computing system to:
when the first representation of the first network object or the second representation of the second network object are selected, present a detail view of the service chain between the first network object and the second network object; and
present at least one configuration option template in the detail view, when selected the at least one configuration option can be used to define the service chain further.

17. The system claim 14, wherein the automatic configuration of the service chain between the first network object and the second network object by the orchestration service includes deploying the automatically configured service chain; and presenting a progress indicator showing a status of the deployment of the service chain.

18. The system claim 14, wherein the instructions cause the computing system to:

when the first representation of the first network object is selected, distinguish all other representations of the network objects to which the first network object is connected.

\* \* \* \* \*